United States Patent [19]
Houdret et al.

[11] 3,889,546
[45] June 17, 1975

[54] PRODUCTION OF V-TYPE TRANSMISSION BELTS

[75] Inventors: Charles Houdret; Jacques Marchand, both of Saint-Leger-des-Vignes, France

[73] Assignee: Pneumatiques, Caoutchouc Manufacture and Plastiques Kleber-Colombes, France

[22] Filed: July 30, 1973

[21] Appl. No.: 383,467

[30] Foreign Application Priority Data
July 28, 1972 France .................. 72.27212

[52] U.S. Cl. ................................ 74/234; 156/140
[51] Int. Cl. ........................... F16g 5/00; B29h 7/22
[58] Field of Search .......... 156/140, 139; 74/231 P, 74/234, 233

[56] References Cited
UNITED STATES PATENTS
| | | | |
|---|---|---|---|
| 3,656,360 | 4/1972 | Fix | 74/234 |
| 3,657,938 | 4/1972 | Fisher | 74/234 |
| 3,713,347 | 1/1973 | Atwell et al. | 74/231 P X |

*Primary Examiner*—Leonard H. Gerin
*Attorney, Agent, or Firm*—Craig & Antonelli

[57] ABSTRACT

A V-type belt whose service life is considerably improved by the use in the base thereof of a rubbery mixture containing a polyolefin having a high molecular weight, said mixture having been brought at least once, either before or at the time of the vulcanization, to a temperature higher than the melting temperature of the polyolefin.

18 Claims, 4 Drawing Figures

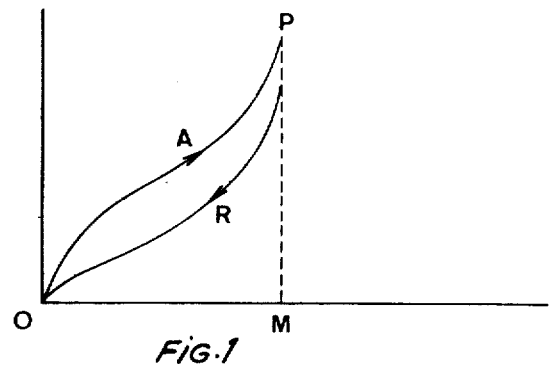
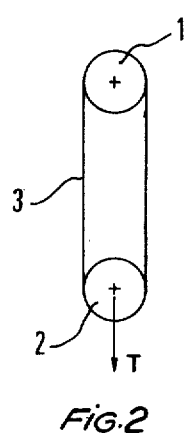
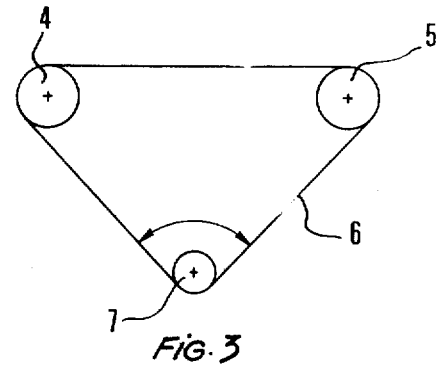
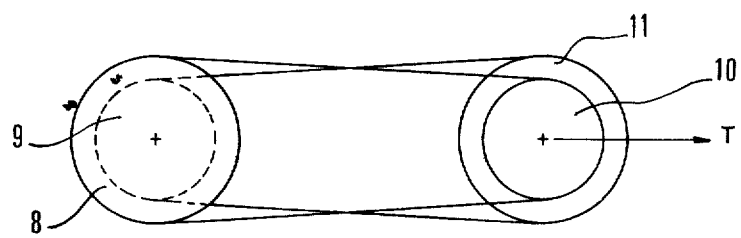

PRODUCTION OF V-TYPE TRANSMISSION BELTS

The present invention relates to V-type transmission belts. In numerous applications, the service conditions imposed upon V-type transmission belts are extremely severe and these conditions have a tendency, in a continuous fashion, to become more and more severe. Therefore, one of the principal problems which these belts present is that of their useful or service life.

Generally, the belts decay due to the appearance on the base thereof of cracks which are propagated to the armature or reinforced portion, i.e. the armature designates the longitudinal cores, ropes or strings located in the belt to resist stretching. It is necessary to point out in this connection that no simple laboratory test makes it possible to estimate the future behavior of a V-belt and, for the moment, no genuine and satisfactory correlation has been found between the period of time at the end of which the cracks appear and certain characteristics, such as the hysteresis value, tearing value, the resistance to repeated bending, which – one would have thought – have a significant influence upon the useful or service life of the transmission belts.

For the purpose of increasing the service life of transmission belts, one in this field has proceeded empirically up to the present time by selecting elastomers, carbon blacks, thermosetting resins, and vulcanization accelerators, the use of which has the effect of delaying the appearance of cracks. Quite certainly, progress has been made, but each time the progress attained has seemed relatively less important, and it seems that this progress no longer allows one to hope for substantial improvements, at least at the level of thise improvements which require certain actual applications.

The present invention is concerned with V-type transmission belts whose useful or service life is considerably increased since it is multiplied 2 or more times.

The V-type transmission belts according to the present invention are characterized notably by virtue of the fact that the base thereof, in other words, the portion thereof situated below the armature or reinforced portion, comprises a rubbery mixture containing a polyolefin having a high molecular weight, such as polyethylene and polypropylene and particularly a polyethylene with a high molecular weight, i.e., higher, for example, than 500,000, and a typical weight of polyethylene used in the present invention has a molecular weight of one million, as measured by the viscosimetry method. Generally, the polyolefins should have a molecular weight between 500,000 and three million. Within the meaning of the term "rubbery mixture," it is intended to identify a mixture of one or several elastomers with the usual different conventional ingredients, such as reinforcing additives such as one or several carbon blacks, silica, thermohardenable (thermosetting) resins, vulcanization agents, vulcanization accelerators, stabilizers, plasticizers, and others. These mixtures may also comprise the conventionally disposed fibers, oriented or not oriented according to certain preferential directions.

The belts according to the present invention may also comprise in the base thereof sheets of fabric and/or sheets of rubbery mixtures with fibers, parallel to the faces of the belts such as stratified belts, and — in a general fashion — these bases may comprise any reinforcements conventionally necessary or useful to being placed there for certain applications. The transmission belts according to the present invention may be either covered (i.e. enveloped) or not.

The quantity of polyolefin in the rubbery mixture, particularly a polyolefin with a molecular weight equal to or greater than 500,000 expressed in parts by weight with respect to a total elastomer weight of 100 parts, is preferably comprised between 5 and 85. In fact, the addition of small quantities very noticeably increases the useful life of the belts, and the addition of relatively significant quantities is possible without reducing the industrial value of the present invention.

The present invention will now be described in further detail with reference to the accompanying drawings and the following detailed description of its preferred embodiments which are illustrative but not limitative thereof, wherein:

FIG. 1 shows a graph with elongation curves illustrating hysteresis;

FIG. 2 shows a test device for evaluating the V-belts;

FIG. 3 shows another test device for evaluating the V-belts; and

FIG. 4 shows still another device for testing the V-belts of the invention.

These embodiments all refer to V-type transmission belts differing only in view of or because of the nature of the rubber mixture constituting the base. These belts were the enveloped type, the height of the trapezoid cross-section was 8 mm; the angle of the flanks or sides was 40°, and the upper face or surface was 10 mm. All belts have been made in the same manner by using the customary forming processes.

Different tests and measurements have been carried out in connection with these belts and the rubbery mixtures constituting the base thereof.

The hysteresis was measured by tracing the elongation curves up to 100% as function of the tractive force in the elongation and relaxing phases. The curves obtained have the course or path represented in FIG. 1, the OAP curve corresponding to the traction phase, and the PRO curve corresponding to the relaxing phase. The energy received by the belt sample corresponds to the OAPMO surface, and the restituted or restored energy corresponds to the ORPMO surface. The OAPRO surface corresponds to the energy which has not been restored, and, hence, to the hysteresis. Hysteresis has been expressed in percentage, with respect to the ratio of OAPRO surface/OAPMO surface, that is to say, no-restored energy/energy received; the resistance to tearing has been measured under the conditions of the standard test designated NFT 46.0007 and expressed in daN by cm. of thickness. (daN = Decanewton)

Test 1 has been made on the device represented in FIG. 2. Two pulleys 1 and 2 having an equal diameter of 60 mm. are mounted, one vertically with respect to the other, and one of them is driven at a speed of 12,000 turns per minute (t/mn) with a vertical stress T and equal to 30 daN, exerted upon the lower pulley.

Test 2 has been made on the device represented in FIG. 3 (standard SAEJ 637). Two pulleys 4 and 5 have the same diameter equal to 117 mm.; one is receiving and the other driving; the power being 9 ch (that is, horsepower) and the speed of rotation being 4900 t/mn; the belt 6 passes on a roller 7 which is free in rotation, and having a diameter equal to 60 mm. This roller is placed in such a manner that the belt forms an angle therewith of 90°.

Test 3 has been made or carried out on the device represented in FIG. 4, which includes four pulleys, the first two positioned in the plane of the figure and the other two positioned behind or spaced from the first. Two driving pulleys 8 and 9 are mounted on the same shaft and are driven at a speed of 4000 t/mn. The pulley 8 in the plane of the figure has a diameter of 87.2 mm., and pulley 9 in back of the figure has a diameter of 84.8 mm. Two other pulleys 10 and 11 are mounted on another shaft, i.e., pulley 10 in the plane of the figure has the same diameter as pulley 8 and pulley 11 in back of the figure has the same diameter as pulley 9. A V-type belt passes over the pulleys 8 and 10, and an identical V-type belt passes over the pulleys 9 and 11. A stress T equal to 36 daN tends to stretch the two belts. Under these conditions, the belts will slip, which causes an elevation or rising of their temperature; and in the course of the test, this temperature is 125°C., whereas it is from 80° to 90°C. in other tests where the greater part or portion of the temperature increase derives from the hysteresis of the rubbery mixture.

In the following five embodiments, the rubbery mixture contains the same quantities, expressed by weight, of the elastomers and the following ingredients:

|  | Parts by Weight |
|---|---|
| elastomers: |  |
| i.e., styrene butadiene co-polymer (SBR 1500) | 70 |
| natural rubber | 30 |
| aromatic oils | 12 |
| sulfur | 2.5 |
| stearic acid | 1.5 |
| zinc oxide | 5 |
| vulcanization accelerator (i.e., cyclohexylbenzothiazylsulfenamide) | 1 |
| antioxidant (i.e., phenyl naphtylamine) | 2 | to which there have been added the quantities of additives, expressed by weight, which are identical in the following table. This table indicates also the results of the measurements and tests which were carried out.

140°C. for the polyethylene used.

The test belts $a$, $A_1$ and $A_2$ are comparable in that they have close Shore hardnesses. The difference between the hysteresis values is not very significant, and these values may be considered as very close, if not equal, (which holds true without doubt for belt $A_1$, where there is more polyethylene and less carbon black than in the control belt $a$ and for the belt $A_2$ where there is the same quantity of carbon black and relatively little polyethylene). Nevertheless, the test results clearly show an appreciable difference in behavior between these belts, and this allows for concluding that it is not the value of the hysteresis which determines the more or less rapid appearance of cracks. This is also confirmed by the results of test 3 in which the belts are brought to a temperature (125°C.) higher than that (80° to 90°C.) which they attain in the other tests where a large part of the heating is due to the hysteresis. In fact, if — supposing it exists — the slight hysteresis reduction of the rubbery mixtures of belts $A_1$ and $A_2$ were responsible for their better behavior during tests 1 and 2, since they lead to a lower heating, there would be no reason that their behavior be better during test No. 3 in which, because of their slipping, and whatever the hysteresis, they are brought to a temperature much higher than is the case in tests 1 and 2. In fact, one would expect that at such temperature, the belts $A_1$, $A_2$, and B have a much poorer behavior since the fusion or melting of the polyethylene begins from 80°C. and continues to temperatures of 138°- 140°C.

In the same manner, the measurements of the tearing stress show that there exists no correlation whatever between these values and the period of time at the end of which cracks appear; and the same holds true for the elongation values at break, and the results of the tests of repeated bending. It is for this reason that in the evaluation of the test sample $b$ and of the belt B, these measurements were omitted.

The test belt $b$ and the belt B are close in their Shore hardness, but the rubbery mixture of the sample $b$ com-

|  | Sample a | $A_1$ | $A_2$ | Sample b | B |
|---|---|---|---|---|---|
| Carbon black (i.e., ISAF black) | 80 | 65 | 80 | 72 | 65 |
| Thermo-hardenable resin (phenol formaldehyde condensation product) | 14 | 14 | 14 | 14 | 0 |
| Polyethylene with a high molecular weight (Hostalen GUR of Hoechst) | 0 | 20 | 10 | 0 | 32 |
| Shore hardness | 81 | 80 | 83 | 77 | 76 |
| Hysteresis | 35 | 33 | 33 | — | — |
| Tearing (kg/cm of the thickness of the test tube) | 40 | 42 | 39 | — | — |
| Test 1 (vertical plane)[1] | 150 h | 400 h | 200 h | 200 h | 420 h |
| Test 2 (test SAE J 637)[1] | 200 h | 400 h | 350 h | 400 h | 700 h |
| Test 3 (plane with circulation of power)[1] | 70 h | 120 h | 90 h | 80 h | 130 h |

[1]Number of hours at the end of which there appear the first cracks; average on five belts.

The mixtures have been made in the customary mixing fashion in an internal mixer and the addition of the vulcanization agents on a cylinder mixer. The belts were made in the customary fashion (with one exception hereinafter described) and the vulcanization was carried out at 150°C. It is important that either in the course of the mixing, or in the course of the vulcanization, or in the course of either one of these operations, the mixture be brought to a temperature higher than the melting temperature of the polyolefin, or 138° to prises 72 parts of carbon black and 14 parts of thermo-hardenable thermosetting resin, whereas that of belt B comprises 32 parts of polyethylene, no thermo-hardenable or thermosetting resin, and only 65 parts of carbon black. The improvement in service life because of the presence of polyethylene is very important.

Actually, it is believed that it is not possible to form precise hypotheses which allow for explaining this phenomenon. Perhaps it is the particular nature of the linkages (or bonds) existing between polyethylene and the elastomers which enter into the rubbery mixture that is responsible for this substantial improvement.

In any event, the presence of a polyolefin having a high molecular weight, particularly a polyethylene having a molecular weight equal to or greater than 500,000 in the rubbery mixture entering into formation of their bases, has the effect of considerably increasing the useful or service life of V-type belts, as the above examples show.

Also, it will be appreciated that thermosetting resins used are always phenol formaldehyde products.

While the novel principles of the invention have been described, it will be understood that various omissions, modifications and changes in these principles may be made by one skilled in the art without departing from the spirit and scope of the invention.

What is claimed is:

1. A V-type belt having a base portion, said base portion comprising a vulcanized rubbery mixture containing at least one elastomer and a polyolefin having a high molecular weight, said mixture having been brought at least once to a temperature higher than the melting temperature of the polyolefin, and at least by the time of vulcanization.

2. The V-type belt according to claim 1, in which the polyolefin is a polyethylene having a molecular weight higher than 500,000.

3. The V-type belt according to claim 1 in which the quantity of polyolefin contained within said rubbery mixture is between about 5 and about 85 parts by weight per 100 parts by weight of the elastomer.

4. The V-type belt according to claim 1, in which the rubbery mixture also comprises other additives including carbon black and/or a thermosetting resin.

5. In a process for producing V-type belts wherein the base of the belt is produced from a rubbery mixture containing at least one elastomer and conventional additives including carbon blacks, silica, thermosetting resins, vulcanization agents, vulcanization accelerators, and the like, and the rubbery mixture is vulcanized after formation of the V-type belt, the improvement which comprises incorporating a polyolefin having a high molecular weight into the rubbery mixture and bringing the mixture at least once to a temperature higher than the melting temperature of the polyolefin, either before or at the time of vulcanization.

6. The process according to claim 5 wherein the polyolefin is a polyethylene having a molecular weight higher than 500,000.

7. The process according to claim 5, in which the amount of polyolefin contained within said rubbery mixture is between about 5 and about 85 parts by weight per 100 parts by weight of the elastomer.

8. The V-type belt according to claim 1, in which the polyolefin is a polyethylene having a molecular weight higher than 500,00 and said mixture is brought to a temperature of 150°C. during vulcanization.

9. The V-type belt according to claim 1, further comprising a fiber-reinforced portion located on said base portion, said fiber-reinforced portion including fibrous material longitudinally positioned within said belt.

10. The V-type belt according to claim 9, in which said fibrous material is in the form of cords, ropes or strings.

11. The V-type belt according to claim 1, in which said belt has a trapezoidal cross-section.

12. The V-type belt according to claim 1, in which the elastomer is a styrene-butadiene copolymer, natural rubber, or a mixture thereof.

13. The V-type belt according to claim 4, in which the thermosetting resin is a phenol formaldehyde condensation product.

14. The process according to claim 5, wherein the polyolefin is a polyethylene having a molecular weight of from 500,000 to three million.

15. The process according to claim 5, wherein the mixture is brought to a temperature higher than the melting temperature of the polyolefin before the time of vulcanization.

16. The process according to claim 5, in which the mixture is brought to a temperature higher than the melting temperature of the polyolefin at the time of vulcanization.

17. The process according to claim 5, in which the polyolefin is a polyethylene having a molecular weight higher than 500,000 and the rubbery mixture is brought to a temperature of 150°C during vulcanization.

18. The process according to claim 5, in which the elastomer is a styrene-butadiene copolymer, natural rubber, or a mixture thereof.

* * * * *